United States Patent
Karpenman (10) Patent No.: US 10,315,660 B2
(45) Date of Patent: Jun. 11, 2019

(54) METHOD FOR CONTROLLING A DRIVETRAIN OF A VEHICLE

(71) Applicant: VOLVO TRUCK CORPORATION, Göteborg (SE)

(72) Inventor: Fredrik Karpenman, Västra Frölunda (SE)

(73) Assignee: Volvo Truck Corporation, Göteborg (SE)

( * ) Notice: Subject to any disclaimer, the term of this patent is extended or adjusted under 35 U.S.C. 154(b) by 237 days.

(21) Appl. No.: 15/317,172

(22) PCT Filed: Jun. 24, 2014

(86) PCT No.: PCT/EP2014/001716
§ 371 (c)(1),
(2) Date: Dec. 8, 2016

(87) PCT Pub. No.: WO2015/197085
PCT Pub. Date: Dec. 30, 2015

(65) Prior Publication Data
US 2017/0101105 A1   Apr. 13, 2017

(51) Int. Cl.
*B60W 30/192* (2012.01)
*F16H 61/04* (2006.01)
(Continued)

(52) U.S. Cl.
CPC .......... *B60W 30/192* (2013.01); *B60W 10/02* (2013.01); *B60W 10/06* (2013.01);
(Continued)

(58) Field of Classification Search
CPC .... B60W 30/192; B60W 10/02; B60W 10/06; B60W 10/113; B60W 2710/021; F16H 61/688; F16H 2063/3036; F16H 2312/022
See application file for complete search history.

(56) References Cited

U.S. PATENT DOCUMENTS

| 9,770,969 | B2 * | 9/2017 | Bjorkman | B60K 1/02 |
| 2011/0054745 | A1 * | 3/2011 | Sato | B60K 6/387 |
| | | | | 701/54 |

(Continued)

FOREIGN PATENT DOCUMENTS

| EP | 1544505 A1 | 6/2005 |
| EP | 2042400 A1 | 4/2009 |

(Continued)

OTHER PUBLICATIONS

International Search Report (dated Apr. 21, 2015) for corresponding International App. PCT/EP2014/001716.

*Primary Examiner* — Stacey A Fluhart
(74) *Attorney, Agent, or Firm* — WRB-IP LLP (57) ABSTRACT

A method is provided for controlling a drivetrain of a vehicle, wherein the drive train includes a combustion engine in drive connection with a dual clutch transmission, wherein the dual clutch transmission is provided with a normally closed input clutch, a normally open input clutch, wherein the normally closed input clutch connecting the combustion engine with a first input shaft and the normally open input clutch connecting the combustion engine with a second input shaft and the first input shaft is in operative connection with a connection sleeve, wherein the connection sleeve can be arranged in an engaged and a disengaged position, whereby in the engaged position the connection sleeve enables an operative connection between the first input shaft to a gearwheel and in the disengaged position gearwheel is disconnected from the first input shaft and the connection sleeve is in a disengaged position when the drivetrain is turned off, wherein the method is automatically initiated at start of the drivetrain, and including the steps of; starting the combustion engine, controlling the normally open and the normally closed input clutch to an engaged or semi engaged state such that both the first and the second (Continued)

input shaft reaches a predetermined synchronized speed, and thereafter opening the normally closed input clutch, and when the countershaft sleeve reaches an essentially synchronous speed with the gearwheel engaging the connection sleeve.

6 Claims, 5 Drawing Sheets

(51) Int. Cl.
    *F16H 61/688*     (2006.01)
    *B60W 10/02*     (2006.01)
    *B60W 10/06*     (2006.01)
    *B60W 10/113*     (2012.01)
    *F16H 63/30*     (2006.01)

(52) U.S. Cl.
    CPC ....... *B60W 10/113* (2013.01); *F16H 61/0403* (2013.01); *F16H 61/688* (2013.01); *B60W 2710/021* (2013.01); *F16H 2063/3036* (2013.01); *F16H 2312/022* (2013.01)

(56) References Cited

U.S. PATENT DOCUMENTS

2011/0174103 A1     7/2011    Kirchner et al.
2013/0081492 A1     4/2013    Hedman et al.

FOREIGN PATENT DOCUMENTS

EP               2407688 A1    1/2012
WO     WO-2014086383 A1 *   6/2014   ............... B60K 6/48

\* cited by examiner

METHOD FOR CONTROLLING A DRIVETRAIN OF A VEHICLE

BACKGROUND AND SUMMARY

The invention relates to a method for controlling a drivetrain of a vehicle, and especially a utility vehicle provided with a dual clutch transmission. The drivetrain comprises a combustion engine connected and a dual clutch transmission, wherein said dual clutch transmission is provided with a normally closed input clutch, a normally open input clutch and a countershaft. The normally closed input clutch connects the combustion engine with a first input shaft and the normally open input clutch connects the combustion engine with a second input shaft. The countershaft is provided with at least one countershaft sleeve, which countershaft sleeve can be arranged in an engaged and a disengage position. In the engaged position the countershaft sleeve enables a torque transfer from the countershaft to the second input shaft and the countershaft sleeve is in a disengage position when said drivetrain is turned off.

The invention can be applied in heavy-duty vehicles, such as trucks, buses and construction equipment. Although the invention will be described, with respect to a truck, the invention is not restricted to this particular vehicle, but may also be used. In other vehicles such as buses and construction equipment and/or personnel cars.

Dual clutch transmissions have been more and more common for personnel cars and commercial vehicles the last years. A dual clutch transmission is commonly provided with a normally closed (engaged) and a normally open (disengaged) clutch. A spring mechanism is acting upon the normally closed clutch such that it engages if there is no active force holding the clutch open. For the normally open clutch, a spring mechanism acts upon the normally open clutch, such that it disengages if there is no active force holding the clutch closed. The clutches are normally operated by a pressure medium driven actuator. Pressure is build up in the system by a compressor; however during a standstill of the vehicle it can be that the pressure in the system is too low to control the clutches. The normally closed clutch is connected to a first input shaft and the normally open clutch is connected to a second input shaft.

During start up of a combustion engine in a drivetrain, it is preferred that as little inertia as possible is coupled to the crankshaft when cranking the combustion engine. Normally, this is achieved in that the normally closed clutch is opened. However, at occasions when the pressure of the pressure medium is for low to control the normally closed clutch to an open position, the combustion engine has to crank with the normally closed clutch in an engaged position. Whereby, the gearwheels of the dual clutch transmission connected to the input shaft of the normally closed clutch will be adding mass that has to be turned during cranking of the combustion engine. To minimise the inertia in these situations a connecting sleeve provided in the transmission is disengaged. The connecting sleeve can be arranged in an engaged and a disengage position. In the engaged position the connection sleeve enables an operative connection between said first input shaft to a gearwheel and in said disengaged position gearwheel is disconnected from said first input shaft. To minimise the inertia when cranking the combustion engine with an engaged normally closed clutch, the connection sleeve is positioned in a disengaged position when said combustion engine is turned off. The connection sleeve must be engaged before an update sequence of the clutches slipping points can be performed. When engaging the countershaft sleeve a tooth to tooth situation must be avoided, i.e. avoid that the tooth to tooth situation blocking the engagement of the sleeve. To do this a central synchroniser can be used in order to synchronise the speed of the countershaft sleeve and the gearwheel it connects to. However, using a central synchroniser is complicated, loud and time consuming, which means a delay before a driver can launch the vehicle.

It is desirable to provide a method to control a dual clutch transmission during a start up of a drivetrain, wherein said method facilitates an easy and fast synchronisation and engagement of a connection sleeve.

A drivetrain of which the method according to an aspect of the invention is applied comprises a combustion engine in drive connection with a dual clutch transmission, wherein the dual clutch transmission is provided with a normally closed input clutch and a normally open input clutch. The normally closed input clutch connecting said combustion engine with a first input shaft and the normally open input clutch connecting said combustion engine with a second input shall. The first input shaft is in operative connection with a connection sleeve, wherein the connection sleeve can be arranged in an engaged and a disengaged position. An operative connection is a connection between torque transfer members in a transmission, such as clutches, gearwheels, shafts and sleeves. When a torque transfer member is in operative connection with another torque transfer member, torque can be transferred between the two members. The torque can be transferred directly from one of the members to another or via an number of other torque transfer members in the transmission.

When the connection sleeve is positioned in the engaged position, the connection sleeve enables an operative connection between the first input shaft to a gearwheel and in said disengaged position gearwheel is disconnected from said first input shaft, i.e. there can be no torque transfer between the first input shaft and the gearwheel.

A gearwheel is normally one member in a gear step, gearwheel pair, gear set or gear stage, wherein the at least other member is normally another gearwheel enabling a torque transfer from one shaft to another.

When the drivetrain is turned off the connection sleeve is positioned in its disengaged position. Further, the transmission is shifted into neutral, such that no torque output is available at the output shaft of the transmission, independently of the torque at the input shafts. The method is automatically initiated at start of said drivetrain, and comprising the steps of;

starting said combustion engine, controlling said normally open and said normally closed input clutch to an engaged or semi engaged state such that both said first and said second input shaft reaches a predetermined synchronised speed, and thereafter opening said normally closed input clutch, and when said connection sleeve reaches an essentially synchronous speed with said gearwheel;

engaging said connection sleeve.

Because the transmission always is controlled such that the connection sleeve is brought to a disengaged position before the drive line is turned off a minimum of inertia is secured even though a control pressure of the normally closed input clutch is below its opening threshold value. Hence, the combustion engine can be cranked with as low inertia contribution from the transmission as possible, even though the normally closed clutch cannot be opened. Further, by always controlling the input clutches such that they are synchronised and thereafter open said normally closed input clutch an essential synchronised speed of the gearwheel and the connection sleeve can be achieved, whereby a locking tooth to tooth situation between the connection sleeve and the gearwheel can be avoided and the sleeve can be engaged with the gearwheel. The engagement of the connection sleeve and the gearwheel is performed before a full synchronisation between the two is reached. By having a slight speed difference between the two a tooth to tooth situation, which prevents an engagement is avoided.

Hence, by performing the method according to the above it is secured the connection sleeve always can be connected to the gearwheel and any tooth to tooth situations are avoided.

In one aspect of the method, before the method step of starting said combustion engine the method comprise the method steps of checking a control pressure of a clutch actuation mechanism, and if said control pressure is above a first threshold value; attempting, to engage said connection sleeve.

By first checking the control pressure of the clutch actuation mechanism it can be determined if an actuation of the input clutches can be performed or not. If the control pressure is above a first threshold value the normally closed input clutch can be controlled to be disengaged. With the normally closed input clutch in a disengaged position, the combustion engine can be cranked with a minimal inertia contribution from the transmission, independently if the connection sleeve is in its engaged or disengaged position, whereby an attempt to engage the connection sleeve is made immediately after the normally closed input clutch has been disengaged. If the connection sleeve can be connected directly, without getting stuck a tooth to tooth situation, the method can be terminated.

In one aspect of the method, between the attempting to engage of the connection sleeve and the starting, of the combustion engine, the method further comprise the steps of;

if said connection sleeve does not engage;

bringing said connection sleeve to its disengaged position; and if said connection sleeve does engage;

disengaging said normally open input clutch, starting said combustion engine, and terminating the method.

By adding these method steps it is secured that the connection sleeve can not engage before a synchronisation process between the connection sleeve and the gearwheel is started. The method becomes as efficient as possible and still as low as possible inertia contribution from the transmission is secured when the combustion engine is cranked. Further, the method secures that a tooth to tooth situation in the connection between the connection sleeve and the gearwheel is solved in a fast and efficient manner.

The invention further concerns a computer program comprising program code means for performing the steps of any aspects of the method, when said program is run on a computer.

The invention further concerns a computer readable medium carrying a computer program comprising program code means for performing the steps of any aspects of the method when said program product is run on a computer.

The invention further concerns control unit for controlling a utility vehicle, the control unit being configured to perform the steps of the method according to any of aspects of the method.

BRIEF DESCRIPTION OF THE DRAWINGS

With reference to the appended drawings, below follows a more detailed description of embodiments of the invention cited as examples.

In the drawings:

FIG. 2 a, b discloses variants of a dual clutch transmission upon which the method can be applied.

DETAILED DESCRIPTION

Figure 1:
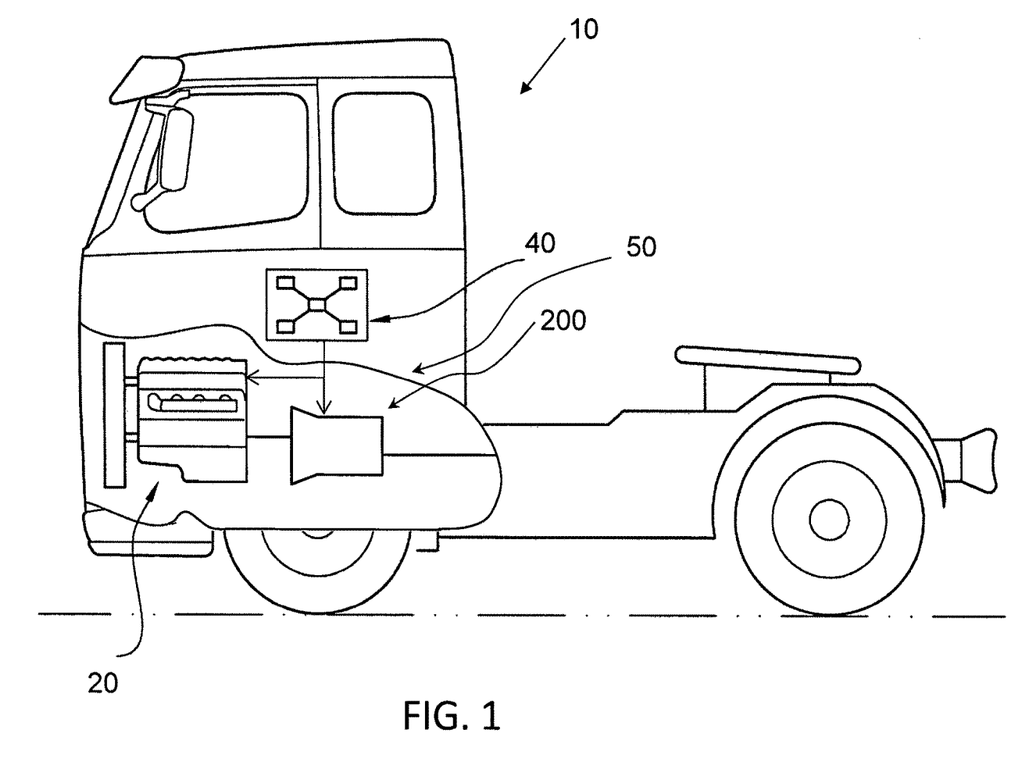
FIG. 1 discloses a truck provided with a drive train upon which the method can be applied.

FIG. 1 discloses a schematic view of a truck 10 comprising as drivetrain 50 with a combustion engine 20 and a transmission 200 and a control unit 40 for controlling the drivetrain 50 of the truck 10.

Figure 2A:
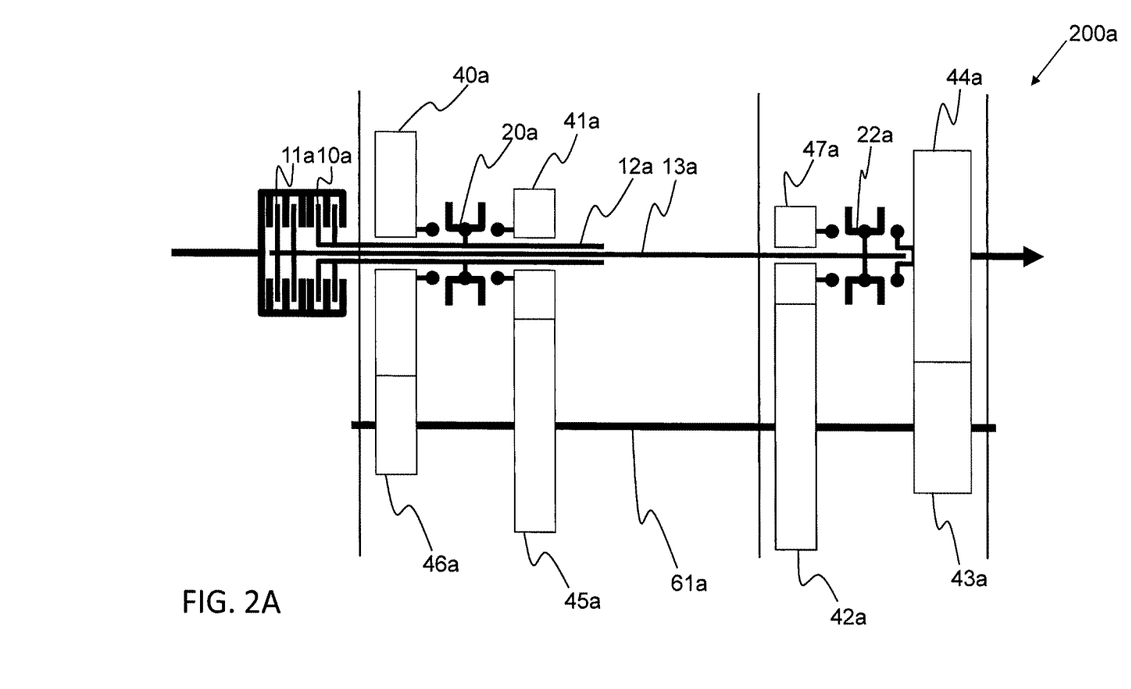
Figure 2B:
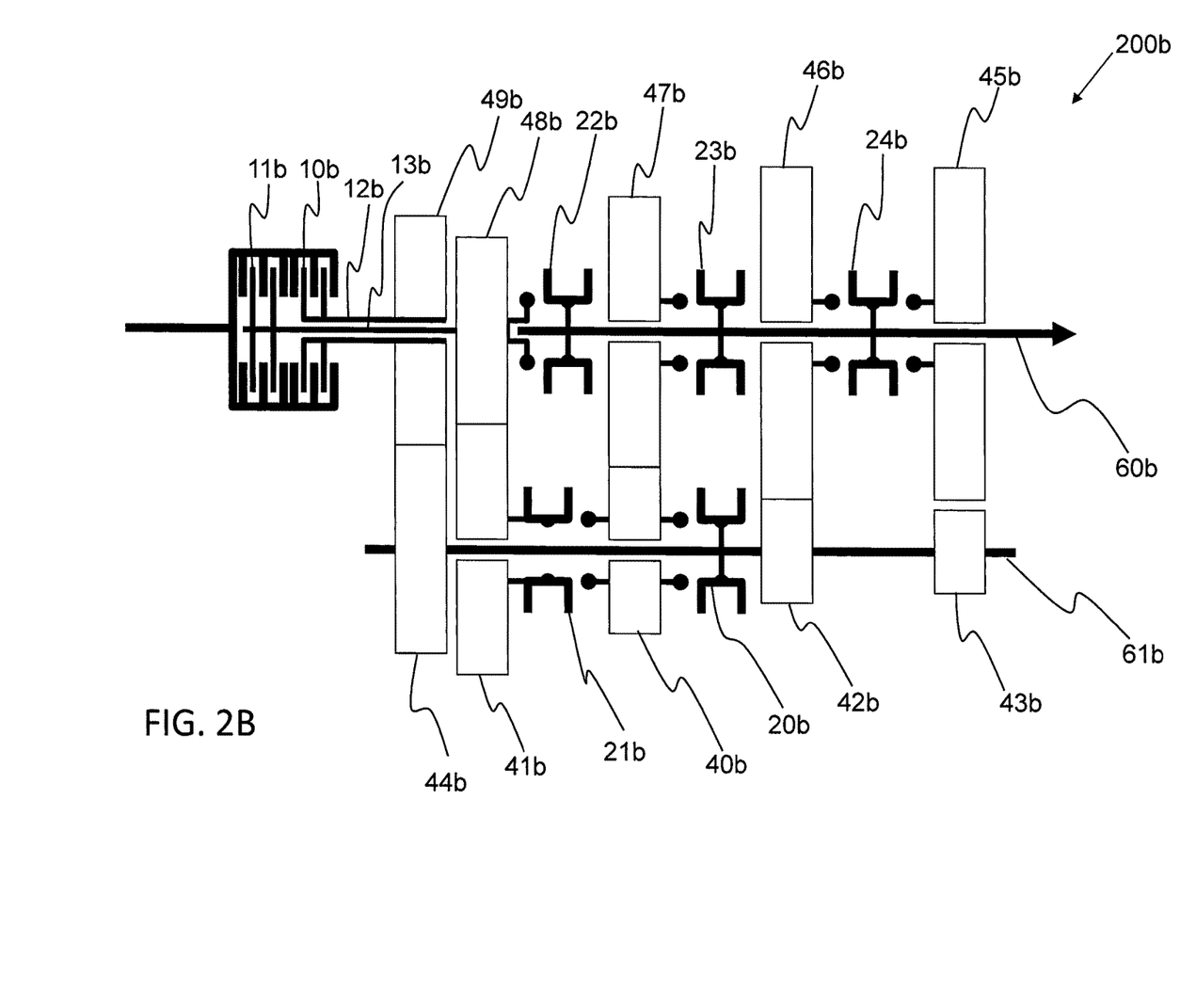

FIGS. 2a and 2b each discloses examples of dual clutch transmission 200a, 200b which can be controlled according to the present method. The common feature of transmission suitable to control with the method is that they have a connection sleeve 20a; 20b, 21b which is or can be in operative connection with the normally closed input clutch 10a; 10b. To minimize the inertia contribution from the transmission 200a; 200b during cranking of the combustion engine, the connection sleeves 20a; 20b, 21b are always controlled to be disengaged when the combustion engine is turned off. The inventive method concerns how to control the connection sleeve 20a; 20b, 21b during start up of a drivetrain, in order to minimize the risk for a tooth to tooth situation when the connection sleeves 20a; 20b, 21b are engaged with respective gearwheel 40a, 40b; 41a, 41b after cranking, of the combustion engine. Hence, the method assures a fast and secure reconnection of the connection sleeve 20a; 20b, 21b after cranking of a combustion engine 20 of the drivetrain 50.

FIG. 2a discloses a dual clutch transmission 200a, provided with a normally closed input clutch 10a first and normally open input clutch 11a, which are adapted to be connected to a combustion engine 20. The dual clutch transmission 200a is provided with a first input shaft 12a connected to the normally closed input clutch 10a and a second input shaft 13a connected to the normally closed input clutch 11a. The transmission 200a is further provided with a countershaft 61a and a plurality of gearwheels 40a-47a, which are rotatably or fixedly arranged upon the shafts of the transmission 200a. Connection sleeves 20a, 22a are provided to connect the rotatably arranged gearwheels with a shaft in order to establish an operative connection between a shaft and a gearwheel.

The first input shaft 12a is provided with a connection sleeve 20a, which can connect the gearwheels 40a and 41a to the input shaft 12a. The connection sleeve 20a is provided with two engaged positions one in each sliding direction in one position the connection sleeve 20a engages with the first gearwheel 40a and in a second position the connection sleeve 20a engages with the second gearwheel 41a. In between the two engaging positions the connection sleeve 20a is positioned in a disengaged position, in which it is not connected to any gearwheel. If the connection sleeve 20a is engaged with either of the gearwheels 40a, 41a, these gearwheels 40a, 41a must be rotated by the starting motor when the combustion engine 20 is cranked, this situation occurs when there is not sufficient control pressure to open the normally closed input clutch 10a before cranking of the combustion engine 20. The connection sleeve 20a is in direct operative connection with the normally closed input clutch 10a and the first input shaft 12a.

FIG. 2b discloses a dual clutch transmission 200b provided with a normally closed input clutch 10b first and normally open input clinch 11b, which are adapted to be connected to a combustion engine. The dual clutch transmission 200b is provided with a first input shaft 12b connected to the normally closed input clutch 10b and a second input shaft 13b connected to the normally open input clutch 11b. The transmission 200b is further provided with a countershaft 61b, a main shaft 60b and a plurality of gearwheels 40b-49b, which are rotatably or fixedly arranged upon the shafts of the transmission 200a.

Connections sleeves 20b-24b are provided to connect the rotatably arranged gearwheels 40b, 41b, 45b, 46b, 47b with a shaft 60b, 61b in order to establish an operative connection between the shaft 60b, 61 and the gearwheel 40b, 41b, 45b, 46b, 47b.

In the transmission 200b, it is the two connection sleeves 20b and 21b that are in operative connection with the normally closed input clutch 10b. It should be noted though that connection sleeve 21b only is in operative connection with the normally closed input clutch 10b if the connection sleeve 20b is engaged. The connection 'sleeves 20b, 21b can connect their respective gearwheel 40b, 41 b rotatably arranged upon the countershaft 61 b. The connection sleeves 20b, 21b can be arranged in an engaged position and a disengaged position respectively. When cranking a combustion engine 20 connected to the transmission 200b, the shafts and gearwheels in operative connection with the first input shaft 12 will also be rotated by the combustion engine. The connection sleeve 20b is in direct operative connection with the normally closed input clutch 10a and the first input shaft 12a via the gearwheel pair 44b, 49b. The connection sleeve 21b is however only in operative connection with the normally closed input clutch 10a if the other connection sleeve 20b is in its engaged position.

Figure 3:
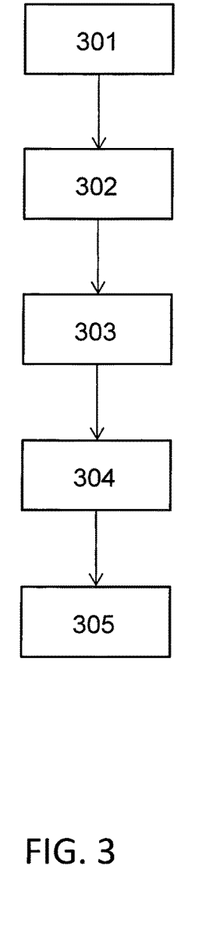
FIG. 3 discloses one aspect of the method.

Now the method will be explained in conjunction with the flow chart disclosed in FIG. 3, which discloses a first aspect of the invention. References will also be made to the FIGS. 1, 2 and 5. The sleeve 20a and 20b will be used as the sleeves which are in operative connection to the first input shaft 12a; 12b. It is further provided that the sleeves 20a and 20b have been disengaged when the drivetrain 50 was turned off. For the transmission 200b in FIG. 2b, this also implies that the connection sleeve 21b is kept engaged when the drivetrain 50 was turned off. The method also applies to connect the connection sleeve 21b, if connection sleeve 21b was the sleeve that has been disengaged when the drivetrain 50 was been turned off.

The method is initiated with a start up 301 of a drivetrain 50, whereas a cranking 302 of the combustion engine 20 is awaited. When the combustion engine 20 has cranked and is running the both the normally closed and the normally open input clutch 10a, 10b; 11a, 11b are controlled to an engaged or semi-engaged state, such that both the first and the second input shaft reaches a predetermined synchronized speed, which normally is the idle speed of the combustion engine 20. A full engagement of the input clutches 10a, 11a; 10b, 11b gives a fast synchronization however also more shock like. A semi-engagement of the input clutches 10a, 11a; 10b, 11b gives a bit slower, but however also a smoother synchronization of the input clutches 10a, 11a; 10b, 11b. When the two input shafts 12a, 13a; 12b, 13b have synchronized, the connection sleeve 20a; 20b will be unsynchronized to the gearwheel 40a; 40b with which it is supposed to engaged, due to different gear ratios between the first input shaft 12a; 12b the connection sleeves 20a; 20b and the second input shaft 13a; 13b and the gearwheels 40a; 40b. When the first and the second input shafts 12a, 12b; 13a, 13b have been synchronized one of the input clutches 10a, 11a; 10b; 11b are disengaged 304, whereby the speed of the shaft 12a, 13a; 12b 13b connected to the opened clutch is decreasing. Which one of the two input clutches 10a, 11a; 10b, 11b that shall be opened is dependent on the gear layout in between the input shafts 12a, 13a; 12b, 13b, whereby the clutch which is in drive connection with the one of the gearwheel 40a; 40b and the connection sleeve 20a; 20b that is having the highest speed shall be opened in order to achieve a synchronized speed between the connection sleeve 20a; 20b and gearwheel 40a; 40b.

When the connection sleeve 20a; 20b and gearwheel 40a; 40b has reached an essentially synchronous speed the connection sleeve 20a; 20b is controlled to engage with said gearwheel 40a; 40b.

Figure 4:
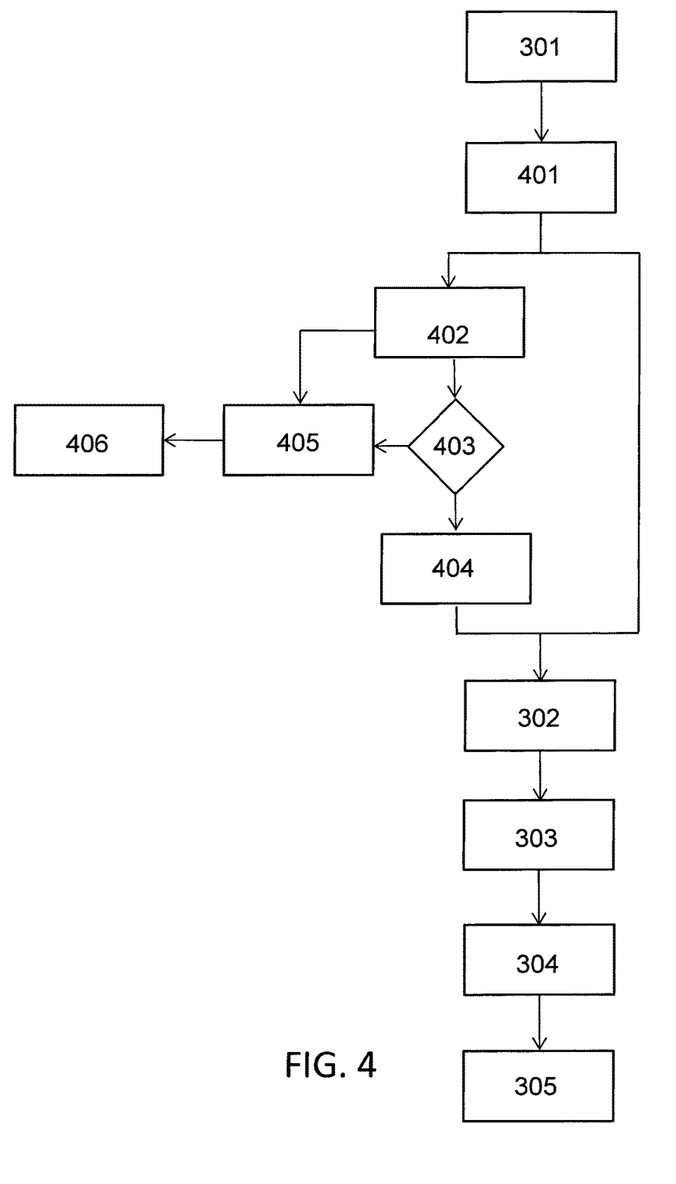
FIG. 4 discloses another aspect of the method.

FIG. 4 discloses another aspect of the method disclosed and described above. Here some method steps 401-405 has been inserted in-between the method step of start up 301 of the drivetrain 50 and cranking, of the combustion engine 302. First after the start up 301 of the drive train a control pressure of a clutch actuation mechanism of the normally closed input clutch 10a; 10b is determined. If the control pressure is above a first threshold value i.e. sufficient to open the normally closed input clutch 10a; 10b, an attempt to engage the connection sleeve 20a; 20b is made. Thereafter in method step 403 it is determined if the connection sleeve 20a; 20b has been fully engaged after a predetermined time limit. If it is determined that the connection sleeve 20a, 20b has been fully engaged, the normally closed input clutch 10a; 10b is opened 405 and the combustion engine 20 can be cranked and the method terminated 406.

However, if it is determined that the connection sleeve 20a; 20b has not been fully engaged after the predetermined time limit, the connection sleeve 20a; 20b is controlled back 404 to its disengaged position, whereby the method continues with the already described method step 302, i.e. cranking of the combustion engine 20.

By adding the additional method steps 402-406, unnecessary clutch wear can be avoided, since the engagement/semi-engagement of the input clutches 10a, 11a; 10b, 11b does not have to be performed, if there are no tooth to tooth situation when engaging the connecting sleeve 20a, 20b.

Figure 5:
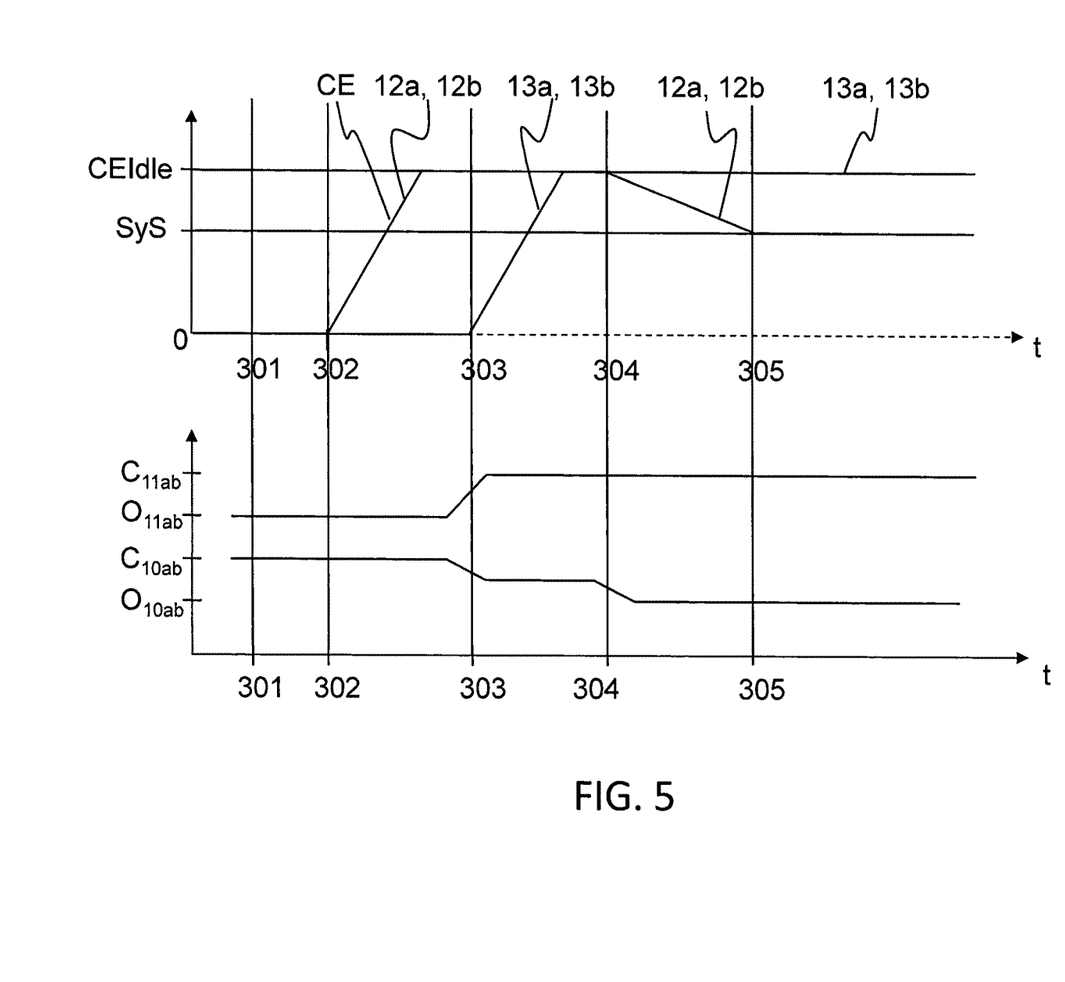
FIG. 5 discloses yet another aspect of the method.

In FIG. 5, a diagram disclosing speeds of the engine 20, the input shaft 12a, 13a; 12b, 13b and the positions of the input clutches 10a, 11a; 10b, 11b in the transmission 200a; 200b at different times of method step 301-305 is disclosed.

The method starts at tO with method step 301 and start up of the drivetrain 50. At this time the engine 20 has still not been cranked whereby there are no rotational speeds in the drive train 50. Hence, the engine 20 and the two input shafts 12a, 13a; 12b, 13b has the speed 0 rpm. The normally closed clutch 10a; 10b is closed C and the normally open clutch 11a; 11b is open O.

Between method step 301 and 302 the method steps 401-406 may be performed. However, with the assumption that a tooth to tooth situation occurs when attempting to engage the connecting sleeve 20b, these method steps does affect any of the disclosed states.

In method step 302 the combustion engine 20 is cranked, whereby the speed of both the combustion engine 20 and the first input shaft 12a; 12b increases to the combustion engines idle speed CEidle. The second input shaft 13a; 13b is however not affected, because it is connected to the normally open input clutch 11*a*; 11*b*.

In method step 303 the speed of the second input shaft 13*b* is increased to reach the combustion engine idle speed CEidle. Here the clutches 10*a*, 11*a*; 10*b*, 11*b* are controlled to an engaged or semi engaged state.

The one of the normally open and the normally closed input clutch 10*a*, 11*a*; 10*b*, 11*b* that is in operative connection with the one of the connection sleeve 20*a*; 20*b* and the gearwheel 40*a*; 40*b* that is associated with the highest speed, opens in order to slow the fast revolving part down. In this example, the connecting sleeve 20*a*; 20*b* rotates faster, whereby it is the normally closed clutch 10*a*, 10*b* that opens in method step 304, in order to slow the connection sleeve 20*a*; 20*b* down to the speed of the gearwheel 40*a*; 40*b*. Whereby, when first input shaft 12*a*; 12*b* reaches a speed corresponding to a synchronized speed between the connection sleeve 20*a*; 20*b* and the gearwheel 40*a*; 40*b*, the connection sleeve is controlled to its engaged position.

By applying the above method and aspects of the method an engagement of the connection sleeve 20*a*; 20*b* can be achieved independently of a central synchronizer. Further, the method can be applied independently of the arrangement of the connecting sleeve upon a countershaft 60*b* or directly upon the first input shaft 12*a*.

It is to be understood that the present invention is not limited to the embodiments described above and illustrated in the drawings; rather, the skilled person will recognize that many changes and modifications may be made within the scope of the appended claims.

The invention claimed is:

1. A method for controlling a drivetrain of a vehicle, wherein the drive train comprises a combustion engine in drive connection with a dual clutch transmission, wherein the dual clutch transmission is provided with a normally closed input clutch, and a normally open input clutch, the normally closed input clutch connecting the combustion engine with a first input shaft and the normally open input clutch connecting the combustion engine with a second input shaft, wherein the first input shaft is in operative connection with a connection sleeve, wherein the connection sleeve is arrangeable in an engaged and a disengaged position, whereby, in the engaged position, the connection sleeve enables an operative connection between the first input shaft and a gearwheel and, in the disengaged position, the gearwheel is disconnected from the first input shaft, and wherein the connection sleeve is in a disengaged position when the engine is turned off, wherein the method is automatically initiated at a start of the engine, the method comprising starting the combustion engine, controlling the normally open input clutch and the normally closed input clutch to engaged or semi-engaged states such that both the first and the second input shaft reach a predetermined synchronised speed, and after both the first and the second input shaft reach the predetermined synchronised speed, opening the normally closed input clutch, and after determining that the connection sleeve has reached an essentially synchronous speed with the gearwheel, engaging the connection sleeve.

2. A method according to claim 1, comprising, before method step of starting the combustion engine, checking a control pressure of a clutch actuation mechanism, and after determining that the control pressure is above a first threshold value attempting to engage the connection sleeve.

3. A method according to claim 2, comprising, between attempting to engage the connection sleeve and the starting of the combustion engine bringing the connection sleeve to its disengaged position when the connection sleeve does not engage; and after determining that the connection sleeve does engage disengaging the normally open input clutch, starting the combustion engine, and terminating the method.

4. A computer comprising a computer program for performing the steps of claim 1 when the program is run on the computer.

5. A non-transitory computer readable medium carrying a computer program for performing the steps of claim 1 when the program is run on a computer.

6. A control unit for controlling a utility vehicle, the control unit being configured to perform the steps of the method according to claim 1.

* * * * *